US012764549B2

(12) United States Patent
Ljung

(10) Patent No.: US 12,764,549 B2
(45) Date of Patent: Oct. 13, 2026

(54) METHODS FOR RADIO RESOURCE PRE-RESERVATION IN AN UNLICENSED CHANNEL, NETWORK NODES AND WIRELESS DEVICES

(71) Applicant: Sony Group Corporation, Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 508 days.

(21) Appl. No.: 18/030,259

(22) PCT Filed: Sep. 16, 2021

(86) PCT No.: PCT/EP2021/075415
§ 371 (c)(1),
(2) Date: Apr. 4, 2023

(87) PCT Pub. No.: WO2022/078699
PCT Pub. Date: Apr. 21, 2022

(65) Prior Publication Data

US 2023/0370854 A1 Nov. 16, 2023

(30) Foreign Application Priority Data

Oct. 16, 2020 (SE) .................................... 2051202-6

(51) Int. Cl.
*H04W 4/00* (2018.01)
*H04L 27/26* (2006.01)
(Continued)

(52) U.S. Cl.
CPC ......... *H04W 16/14* (2013.01); *H04L 27/2601* (2013.01); *H04W 74/006* (2013.01)

(58) Field of Classification Search
CPC ..................................................... H04W 16/14
See application file for complete search history.

(56) References Cited

U.S. PATENT DOCUMENTS

2015/0373741 A1 12/2015 Yerramalli et al.
2016/0135212 A1 5/2016 Wong et al.
(Continued)

FOREIGN PATENT DOCUMENTS

CN 109156026 A 1/2019
CN 110831163 A 2/2020
(Continued)

OTHER PUBLICATIONS

Huawei, "Feature lead summary#3 of HARQ enhancements for NR-U". [online], 3GPP TSG RAN WGI #98 R1-1909806, Aug. 26, 2019.

(Continued)

*Primary Examiner* — Elisabeth Benoit Magloire
(74) *Attorney, Agent, or Firm* — Tucker Ellis LLP

(57) ABSTRACT

Disclosed is a method, performed by a network node, for radio resource pre-reservation for communication of a first wireless device in an unlicensed channel. The method comprises determining an additional spectrum resource allocable for communication based on a successful clear channel assessment procedure conducted by the network node. The additional spectrum resource is different from a first resource used for ongoing communication with the first wireless device. The method comprises transmitting, to the first wireless device, control signalling indicative of the additional spectrum resource.

20 Claims, 10 Drawing Sheets

(51) Int. Cl.

| | |
|---|---|
| ***H04W 16/14*** | (2009.01) |
| ***H04W 74/00*** | (2009.01) |

(56) References Cited

U.S. PATENT DOCUMENTS

| | | | | |
|---|---|---|---|---|
| 2017/0055193 | A1 | 2/2017 | Mueck et al. | |
| 2017/0202018 | A1 | 7/2017 | Cha et al. | |
| 2018/0242372 | A1 | 8/2018 | Yang | |
| 2019/0246431 | A1 | 8/2019 | Baghel et al. | |
| 2019/0253200 | A1 | 8/2019 | Salem | |
| 2020/0229041 | A1 | 7/2020 | Nguyen et al. | |
| 2020/0314899 | A1* | 10/2020 | Sun | H04L 5/0053 |
| 2021/0391906 | A1* | 12/2021 | Oteri | H04L 5/0048 |
| 2022/0150917 | A1* | 5/2022 | Wang | H04W 16/14 |
| 2022/0225412 | A1* | 7/2022 | Tooher | H04W 72/23 |
| 2022/0322440 | A1* | 10/2022 | Munz | H04W 74/0816 |
| 2023/0389010 | A1* | 11/2023 | Guo | H04W 72/56 |

FOREIGN PATENT DOCUMENTS

| | | | |
|---|---|---|---|
| CN | 111294868 | A | 6/2020 |
| JP | 2018137792 | A | 8/2018 |
| WO | WO-2019132234 | A1 | 7/2019 |
| WO | 2020029116 | A1 | 2/2020 |
| WO | 2020142683 | A1 | 7/2020 |

OTHER PUBLICATIONS

International Search Report and Written Opinion from corresponding International Application No. PCT/EP2021/075415, mailed on Dec. 23, 2021, 12 pages.

Office Action and Search Report from corresponding Swedish Application No. 2051202-6, mailed on May 19, 2021, 10 pages.

Georgios Orfanos, "Development and Performance Evaluation of an MAC Protocol for MC-CDMA Wireless LANs with QoS Support," Jul. 19, 2006, 33 pages, including 2 pages of repeated abstract in German.

Georgios Orfanos, "Development and Performance Evaluation of an Adaptive MAC Protocol for MC-CDMA Wireless LANS with Qos Support",No. 52, Jul. 1, 2006, pp. 136-138.

* cited by examiner

METHODS FOR RADIO RESOURCE PRE-RESERVATION IN AN UNLICENSED CHANNEL, NETWORK NODES AND WIRELESS DEVICES

The present disclosure pertains to the field of wireless communications. The present disclosure relates to methods for radio resource pre-reservation in an unlicensed channel, related network nodes and related wireless devices.

BACKGROUND

In 3rd Generation Partnership Project, 3GPP, support for communication over a shared spectrum such as an unlicensed frequency band has been specified. The specifications include the communication over shared spectrum using LTE radio protocol as well as the new radio (NR) protocol. 3GPP NR is a flexible radio protocol, with support for several services and traffic types.

One of the challenges when communicating using an open spectrum is that spectrum regulations may require a Clear Channel Assessment (CCA) procedure to be performed. For services requiring low latency communication, for example the services envisioned which 3GPP specifies as so-called ultra-reliable and low-latency communication (URLLC) is that executing the CCA procedure prior to the transmission consumes time and adds to the latency in the communication. Specifically, in a 3GPP system, this challenge is combined with the general principles of handling the radio resource allocations and scheduling in the network, which adds to the complexity of being able to quickly prepare resources for low latency uplink communication.

SUMMARY

Therefore, there exists a need for further development of signaling and techniques to overcome the challenges. Accordingly, there is a need for network nodes, wireless devices and methods for radio resource pre-reservation for communication of a wireless device in an unlicensed channel, which mitigate, alleviate or address the shortcomings existing and can reduce latency for an instant need of resources e.g. for uplink data transmission in a wireless communication system using a centralized scheduling approach.

Disclosed is a method, performed by a network node, for radio resource pre-reservation for communication of a first wireless device in an unlicensed channel. The method comprises determining an additional spectrum resource allocable for communication based on a successful clear channel assessment procedure conducted by the network node. The additional spectrum resource is different from a first resource used for ongoing communication with the first wireless device. The method comprises transmitting, to the first wireless device, control signalling indicative of the additional spectrum resource.

Further, a network node device is provided, the network node comprising memory circuitry, processor circuitry, and a wireless interface. The network node is configured to perform any of the methods related to a network node disclosed herein.

It is an advantage of the present disclosure that the disclosed network node and related method provides a reduction of latency and may provide a flexible resource allocation method for allocating an additional spectrum resource to the first wireless device in an unlicensed band. The first wireless device can use the allocated additional spectrum resource for an instant need for uplink data transmission e.g. that may require a larger amount of transmission resources than the resources the wireless device may have requested, e.g. as part of a scheduling request. The solution may be applicable for several types of traffic, use cases and protocols, e.g. for low-latency uplink transmissions because the additional spectrum resource is already cleared by the network node having conducted the clear channel assessment. In other words, the disclosed network node can ensure that scheduling of resources can be done in a flexible and efficient manner for data to be transmitted by a wireless device over an unlicensed channel where clear channel access, such as listen-before-talk, is required.

Disclosed is a method, performed by a wireless device. The method comprises receiving, from a network node, control signalling indicative of an additional spectrum resource where a clear channel assessment has been successfully performed by the network node. The additional spectrum resource is different from a first resource used for ongoing communication between the wireless device and the network node.

A wireless device is disclosed, the wireless device comprising memory circuitry, processor circuitry, and a wireless interface. The wireless device is configured to perform any of the methods related to a wireless device disclosed herein.

It is an advantage of the present disclosure that the disclosed wireless device and related method enables flexible, e.g. faster, access to the channel, using additional available resource(s) which the wireless device may not have requested in a resource request. The wireless device may use the additional spectrum resources for transmission e.g. for transmission of data requiring low latency communication, or for bursty traffic patterns (e.g. exhibiting bursts in the traffic pattern) where resource allocation estimation may be difficult to perform in advance. The disclosed wireless device can evaluate the instantaneous incoming data for its transmission buffer, and if there is any data to be transmitted, e.g. it may be a different amount of data compared to an earlier estimate or it may be a different Quality of Service, QoS, level than earlier indicated, the wireless device can aim to utilize the additional spectrum resources as being allocated via the disclosed control signalling.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
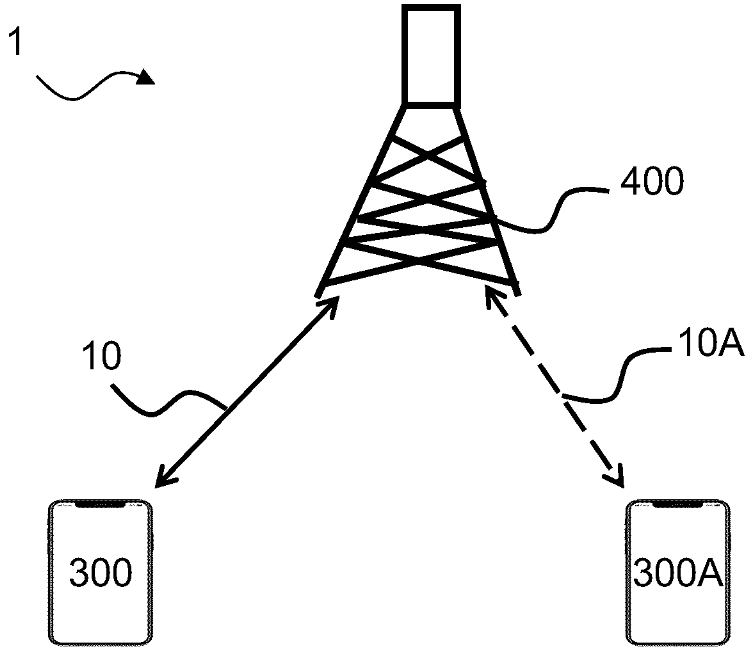
FIG. 1 is a diagram illustrating an example wireless communication system comprising an example network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example network node 400 and an example wireless device 300 according to this disclosure.

As discussed in detail herein, the present disclosure relates to a wireless communication system 1 comprising a cellular system, for example, a 3GPP wireless communication system, for example operating in a non-open restricted spectrum (such as a licensed band) and/or an open shared spectrum (such as an unlicensed band). The wireless communication system 1 comprises a wireless device 300, 300A and/or a network node 400.

A network node disclosed herein refers to a radio access network node operating in the radio access network, such as a base station, an evolved Node B, eNB, gNB.

The wireless communication system 1 described herein may comprise one or more wireless devices 300, 300A, and/or one or more network nodes 400, such as one or more of: a base station, an eNB, a gNB and/or an access point.

A wireless device may refer to a mobile device and/or a user equipment, UE.

The wireless device 300, 300A may be configured to communicate with the network node 400 via a wireless link (or radio access link) 10, 10A.

Figure 2A:
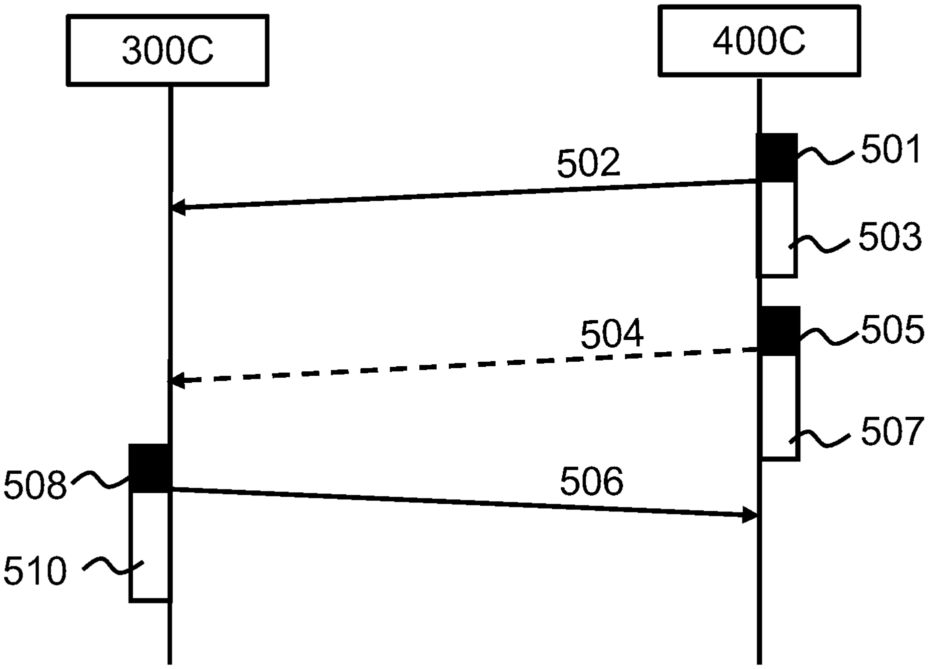
FIG. 2A is a signalling diagram illustrating a scheduling of an uplink transmission.

FIG. 2A is a signalling diagram illustrating an existing method available for a scheduling of an uplink transmission. The scheduling of the uplink transmission illustrated in FIG. 2A involves a configured grant, in an RRC connected state. A configured grant may be seen as a method for a network node 4000 (such as gNB) to indicate to a wireless device 3000 (such as UE) a set of resources in the future which the wireless device 3000 can use without transmitting a scheduling request. The configured grant is developed as part of the ultra-reliable-low-latency-communication (URLLC) specification work in 3GPP. With preconfigured resources via configured grant, the network node 4000 can pre-allocate a set of resources to a wireless device 3000 using Radio Resource Configuration (RRC) messages such as an RRC configuration message 502, with a configured grant configuration, and optionally with details about the resources allocated. The pre-allocation into future possible transmissions may be providing a recurring grant. For example, message 502 may be seen as a ConfiguredGrantConfig message including the parameter RRC-ConfiguredUplinkGrant or as a combination of an RRC configuration with a layer 1 indication 504 (Downlink Control Information—DCI) that specifies each grant in more detail for the wireless device 3000 to use. For example, with a DCI, the RRC configuration can provide a higher layer parameter ConfiguredGrant-Config not including rrc-ConfiguredUplinkGrant. The wireless device 3000 can then, upon the time in the future corresponding to the grant send its uplink data 506 according to the configured grant.

However, the technique illustrated in 501-507 of FIG. 2A can only be used for reserving resources from the network node perspective and does not support the pre-reservation of resources on the open spectrum or unlicensed spectrum. In the unlicensed spectrum, we may consider a case where each transmission is required to start with a CCA procedure to evaluate if the channel is free or busy. FIG. 2A shows CCA procedures 501, 505, 508, followed by respective channel occupancy times 503, 507, 510 indicating that the channel is available for transmission when CCA is successfully performed. As shown in FIG. 2A, the CCA procedures may be time consuming. Further, the CCA procedure may not succeed, meaning that although the network has configured a grant, the channel may not be available according to the grant. The signalling of FIG. 2A does not permit any adaptation of the CCA procedure that the future reservation of resources will impose for the future transmission over an unlicensed spectrum. The configured grant method as specified in legacy 3GPP specifications and illustrated in FIG. 2A may have drawbacks for communication over an open spectrum, since the time required and the flexibility of the configured grant signaling may not meet the needs for communication on the open spectrum. The network node cannot know in advance whether the medium will be available or not in the unlicensed spectrum, and therefore the configured grant can at most indicate the network node scheduling intention, while the configured grant cannot be indicative of whether any other transmitter, e.g. other nodes than a network node 4000 or wireless device 3000 is going to utilize the spectrum intended in the configured grant in the future. In other words, in the unlicensed spectrum (such as unlicensed band and/or unlicensed channel), the network node is not capable of knowing in advance whether the channel is available, and/or free, and/or clear.

Figure 2B:
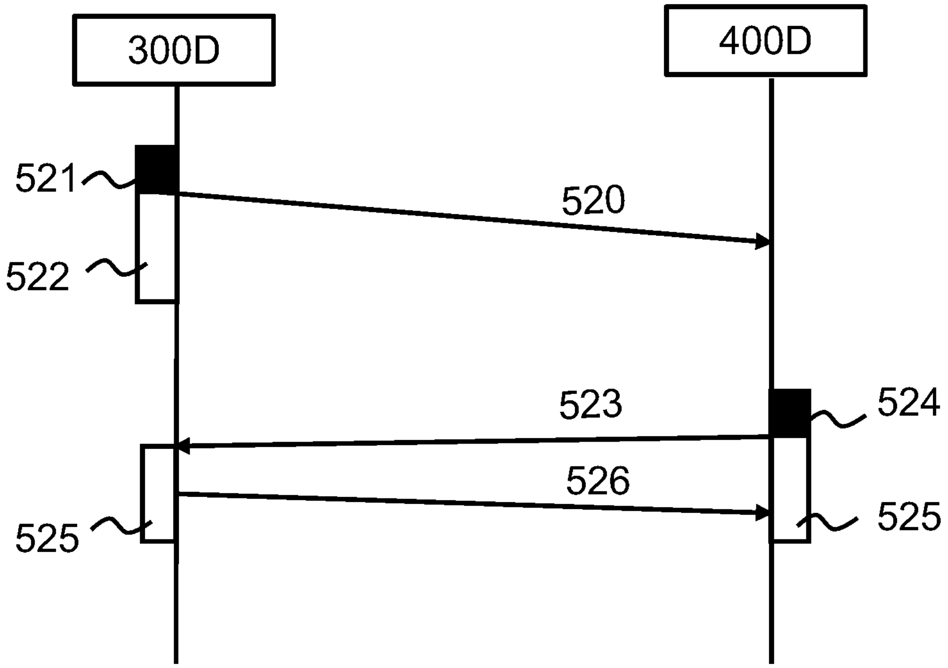
FIG. 2B is a signalling diagram illustrating channel occupancy time sharing.

FIG. 2B is a signalling diagram illustrating channel occupancy time (COT) sharing, which is a method to simplify the CCA procedure in certain communication scenarios. The method may be allowed for certain open spectra, based on the individual spectrum regulations. A channel occupancy time sharing (so called COT-sharing) enables a wireless device, such as wireless device 300D, to utilize, a time within a time slot available for transmission which another wireless device has just recently utilized for communication over the open spectrum. A principle of COT sharing is illustrated in FIG. 2B and is specified in 3GPP TS 37.213 v16.2.0 titled “Physical layer procedures for shared spectrum channel access”. Although the general COT sharing mechanism is a method for using resources initially reserved by another node, the mechanism as specified in existing standard does not meet the needs for flexibility and low latency scheduling that may arise in situations of instant needs for spectrum resources. The principle of COT sharing is utilized as a baseline enabler that may be used with the enhancements disclosed herein.

In FIG. 2B, prior to the actual COT sharing principle for data transmission, there may be control signaling transmitted, e.g. for a data scheduling request. In such case, the wireless device may perform a CCA procedure 521, according to access regulation rules for the open spectrum. A success of a CCA procedure may result in obtaining a right to access the channel, wherein the access right may depend on the type of CCA procedure conducted. The access right may be limited to allowing access of the channel during a maximum given time period that may be determined as a maximum channel occupancy time, COT, 522. The wireless device may send a scheduling request 520 to the network node 400D using the part of the open spectrum on which the CCA procedure has been successful. The network node 400D intends to transmit a scheduling grant 523 to the wireless device and performs a CCA procedure 524, and determines a COT 525, e.g. based on any of or combinations of the access rules, the type of signaling to transmit, the type of CCA procedure conducted. Different COT sharing principles may be employed in the channel access regulations, e.g. in terms of whether the wireless device needs to be explicitly notified that COT sharing for the utilized resources is allowed or not. In this example, explicit indication is illustrated wherein a scheduling grant 523 with a shared channel occupancy indication in DCI is sent. With the principle of COT sharing, here indicated explicitly by the network node 400D in the signaling 523, the spectrum used for the signaling can continue to be used by the wireless device 300D, and the wireless device may therefore perform a different CCA procedure, or the channel access rules may even allow for skipping CCA procedure for a transmission occurring in a relatively short time period after the transmission by the network node 400D. The specific spectrum may be utilized for such sharing during a given time period that may be limited to, at most, the remaining time of the channel occupancy time 525. The scheduling grant 523 is received by the wireless device 300D in a COT 525, which via this COT sharing principle is shared for communication with the wireless device, and the wireless device 300D sends data 526 according to the scheduling grant 523. In other words, the wireless device 300D transmits within the shared COT 525, or the shared COT window.

Other signaling procedures and signaling types may also utilize COT sharing besides the scheduling of data transmissions, including but not limiting to ACK/NACK signaling as response to data transmissions or random access procedure signaling.

FIG. 2B shows that when the network node 400D shares the COT with the wireless device 300D, there is no CCA procedure included prior to the wireless device transmission 526 during the shared COT. FIG. 2B shows a typical case, but in certain scenarios, a different CCA procedure may be required (by spectrum regulation or system specification). Such different CCA procedure triggered by the sharing of the resources may for example include a requirement to perform an energy level detection using a different time period compared to a timing used in the first CCA procedure. Other parameters may differ in such CCA procedure, e.g. changes in the requirements for so-called back-off in case of sensing an energy level above a threshold, different energy level, or other variations. In other words, a different CCA procedure with the intention to be simplified or faster may be performed but a CCA procedure may still need to be performed. Different CCA procedures may be required depending on the idle time of the spectrum between two transmissions. As one example the requirement for the wireless device 300D to perform CCA procedure for a transmission within a shared COT may differ depending on the time between transmission indication for COT sharing 523 and a transmission 526 using the shared COT.

The present disclosure provides a technique that allows a network node to indicate to a wireless device spectrum resource(s) on which the network node has conducted a clear channel assessment (such as Listen Before Talk) procedure, and the wireless device can utilize for communication (such as low-latency communication) even if the wireless device has not requested these resources in advance, wherein the spectrum resources are separate from the resources used to conduct control signalling carrying the indication.

Figure 2C:
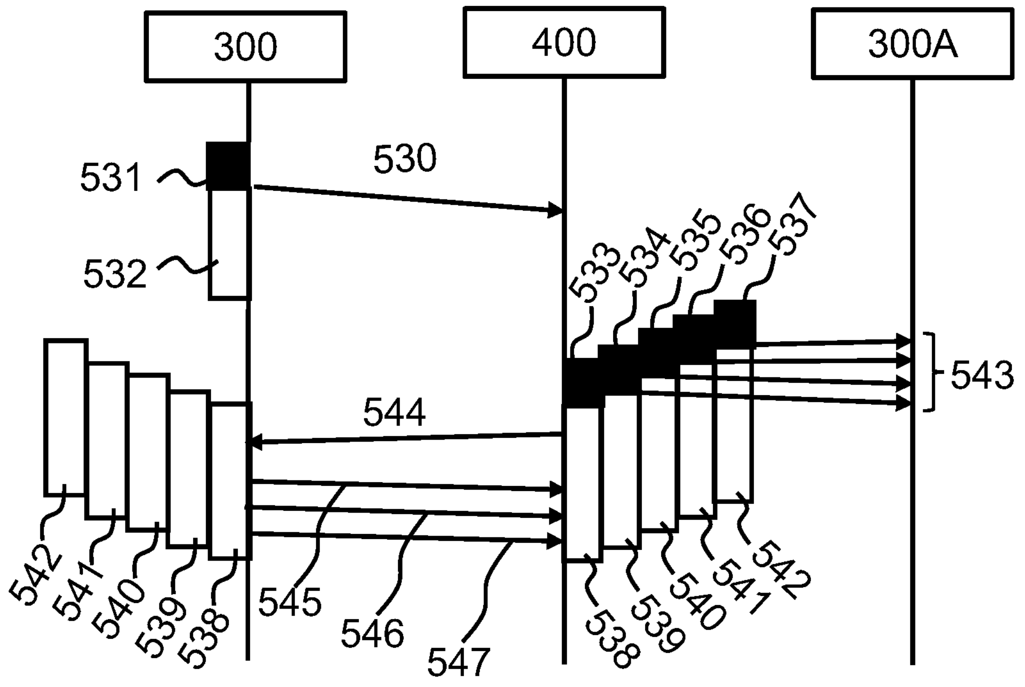
FIG. 2C is a signalling diagram illustrating an example radio resource pre-reservation according to this disclosure.

FIG. 2C is a signalling diagram illustrating an example radio resource pre-reservation according to this disclosure. The present disclosure proposes, inter alia, a signaling 544 indicating which additional spectrum resource(s) (here illustrated as additional time resources 539, 540, 541, 542), besides the resources 538 being used for the signaling 544, on which the network node 400 has already conducted a Clear Channel Assessment 534, 535, 536, 537 (e.g. Listen Before Talk—LBT) procedure step prior to communication with a wireless device. The network node 400 may have conducted the CCA for the one or more additional spectrum resources for potential communication with one or more wireless devices. Such wireless devices may be one or more other wireless devices 300A, or the wireless device 300. The additional spectrum resource(s) disclosed herein are separate from a first resource (such as resource 538 of FIG. 2C) that is already used for the signaling 544 with the first wireless device 300. In FIG. 2C the additional spectrum resources are illustrated by means of time-windows 539, 540, 541, 542 which are each indicative of a specific maximum channel occupancy time for an additional spectrum resource respectively. The time window illustration is only indicative. The network node may utilize a same time window for two or more allocations. Other wireless devices such as wireless device 300A can overhear the CCA performed by network node 440, via 543.

As illustrated in FIG. 2C, the wireless device 300 as well as the network node 400 may need to perform CCA procedures 531, 533 prior to accessing the spectrum range for each transmission 530, 544 on the spectrum. CCA procedure 531 is followed by a maximum COT 532.

Figure 2D:
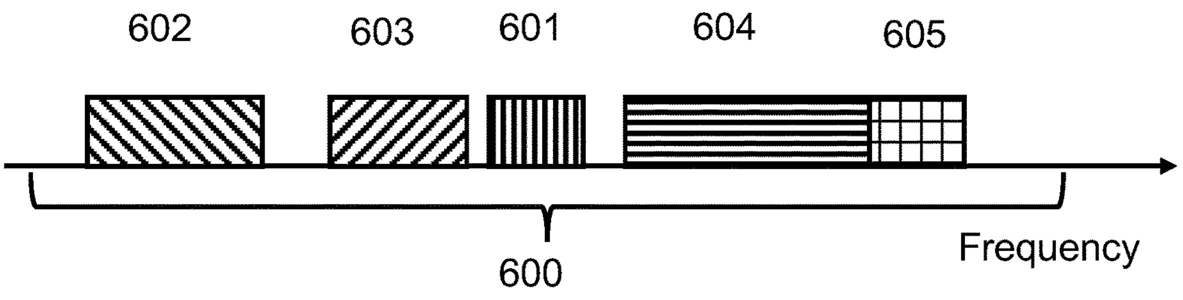
FIG. 2D is a diagram illustrating an example radio resource pre-reservation from a frequency perspective according to this disclosure.

FIG. 2D is a diagram illustrating an example radio resource pre-reservation from a frequency perspective according to this disclosure. FIG. 2D shows frequency as x-axis. The frequency axis shows a frequency domain 600 of the open or unlicensed spectrum. The frequency domain 600 may consist of one or more frequency bands as determined configurable for communication using communication protocols allowed for communication over the one or more frequency bands. The frequency domain 600 may be contiguous or non-contiguous. FIG. 2D shows a frequency range 601 which is utilized for the current signalling in this example (e.g. signaling of message 530, 544 illustrated in FIG. 2C) with the wireless device. The frequency range as being utilized may be the whole or a subset of a frequency band for use by the communication system. Such subset may be a bandwidth part (BWP).

FIG. 2D shows additional frequency ranges 602, 603, 604, 605 that may be allocated as additional spectrum resources which may be used by the wireless device. The frequency ranges may vary in size and position in the frequency domain as FIG. 2D serves as an example illustration. The illustrations and example in this figure illustrates a single frequency range 601 being used for an ongoing communication between a network node and a wireless device. This may illustrate one example, where such example may be using a time division duplexing (TDD) scheme for transmissions. Other examples may at least partly utilize frequency division duplex (FDD) where two or more frequency ranges may be used for uplink and/or downlink control and/or data transmissions.

Figure 2E:
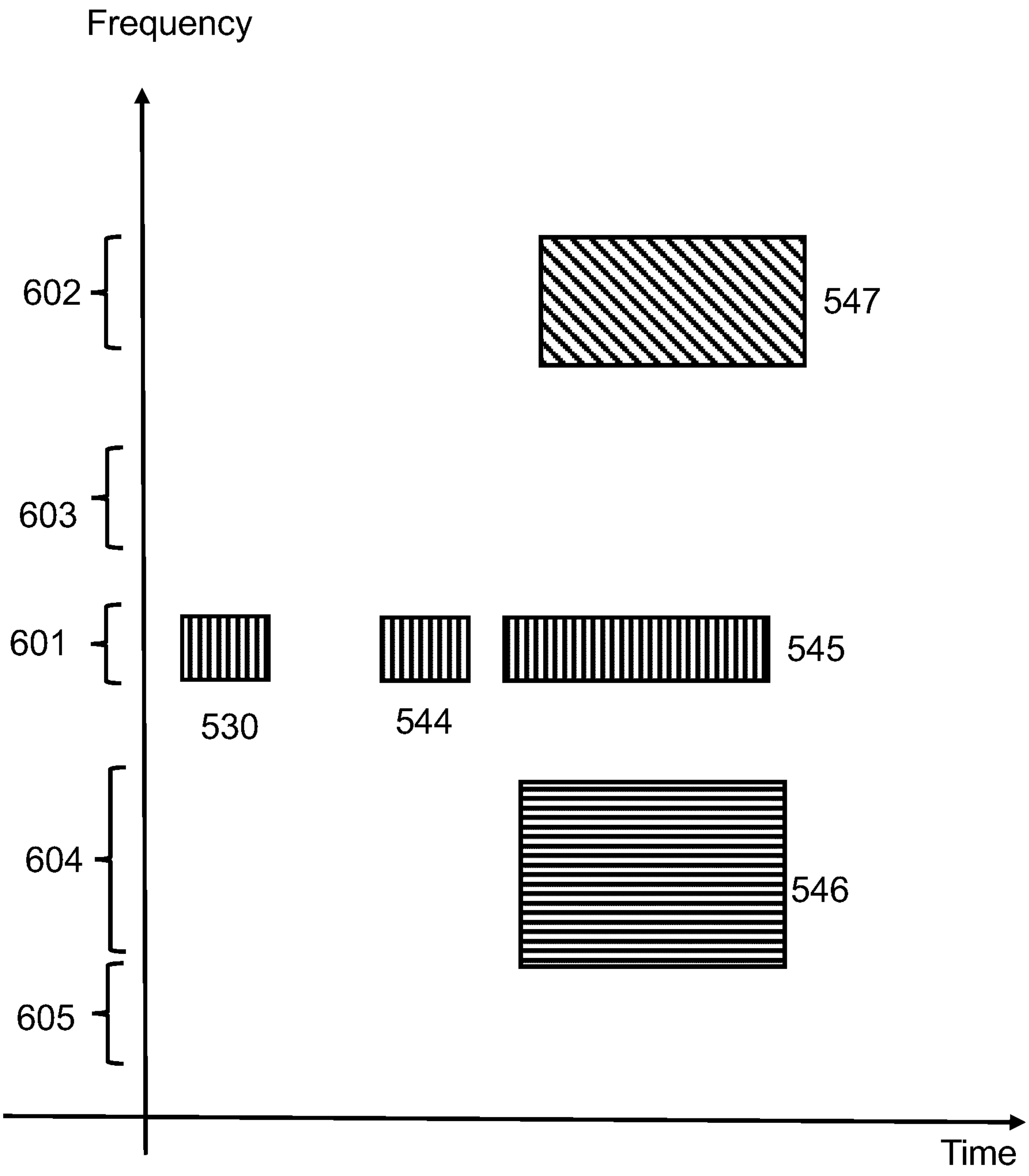
FIG. 2E is a diagram illustrating an example radio resource pre-reservation from a frequency and time perspective according to this disclosure.

FIG. 2E is a diagram illustrating an example of resource allocations in time and frequency according to this disclosure. FIG. 2E shows time on x-axis and frequency on y-axis. FIG. 2E therefore illustrates a resource grid of time and frequency. A filled square in FIG. 2E illustrates a transmission (usage of a frequency range over a given time period) within the resource grid. The frequency range 601 is illustrated as being utilized during periods of times for the communication 530, 544 between the network node 400 and the wireless device 300. As illustrated in FIG. 2C, the wireless device 300 as well as the network node 400 may need to perform CCA procedures 531, 533 prior to accessing the spectrum range 601 for each transmission 530, 544 on the spectrum.

As disclosed herein, the network node 400 may perform CCA procedure 534, 535, 536, 537 of FIG. 2C on additional spectrum resources 602, 603, 604, 605 of FIG. 2E other than e.g. the CCA procedure 533 of FIG. 2C. The CCA procedure 533 may be performed for the intended transmission 544 to the wireless device 300 and the transmission 544 may be executed upon successful CCA procedure 533, while other CCA procedure(s) 534, 535, 536, 537 of FIG. 2C may as example be performed for possible transmissions other than the transmission 544 of FIG. 2C on spectrum range 601 of FIG. 2E. The network node 400 may transmit to the wireless device 300 information indicative of the additional spectrum resources where successful CCA procedures have been performed. Informing about successful CCA procedure may comprise providing control signalling as an indication of additional spectrum resources 602, 603, 604, 605 which the network node 400 considers as available for potential transmission. The transmission of the information regarding additional spectrum resources to the wireless device 300 may be included in the control signaling 544 in one or more examples. Further, the information regarding additional spectrum resources transmitted via control signalling to the wireless device 300 may include time limitations for the potential usage of the additional spectrum resources 602, 603, 604, 605. Such time limitations may include information indicative of maximum channel occupancy time values for one or more additional spectrum resources. Such COT information is illustrated as 539, 540, 541, 542 in FIG. 2C. FIG. 2E further illustrates as an example transmission 546, 547 on additional spectrum resources 604, 602 respectively. In examples provided herein, and as illustrated in FIG. 2C, the wireless device 300 may not be required to perform CCA prior to transmissions 546, 547 over additional spectrum resources 604, 602 associated with COTs 539 and 540

The CCA procedure 534, 535, 536, 537 may be seen as done with the purpose of pre-allocating a channel availability of an unlicensed (such as open and/or shared) spectrum for uplink communication from wireless devices to the network node 400.

The channel access regulations to utilize the open spectrum may be defined in a way that the method as illustrated in FIG. 2C allows for reducing the time required for the wireless device to access the additional spectrum resource(s) as compared to the legacy procedure. The CCA procedure required to be conducted prior to a COT sharing may include requirements that result in a relatively long time to succeed with the CCA. Prior to COT sharing, the CCA procedure may e.g. include one or more requirements to perform a longer channel sensing time period, a requirement to perform a back-off procedure or a more extensive back-off procedure in case the spectrum is not immediately available during the CCA procedure, a requirement to use a different channel sensing mechanism e.g. different energy level, different directional sensing via different antenna configurations or similar.

With any such difference in the CCA procedure required prior to and after a COT sharing, the resulting effect from the procedure as illustrated in FIG. 2C is a more flexible or quicker access to the additional spectrum resources indicated via the shared COT.

The disclosed technique illustrated for example in FIG. 2C may be seen as adding one or more functionalities on top of the channel occupancy time sharing (COT-sharing) illustrated in FIG. 2B and the available legacy signaling methods for allocating low latency communication resources (URLLC configured grant) illustrated in FIG. 2A.

In FIG. 2C, the disclosed functionality added into the signaling may be seen as the possibility for the network node 400 to indicate available additional spectrum resource(s) as indicated by the time slots 539, 540, 541, 542 (such as channel occupancy time slots for additional potential spectrum resource(s)) other than the resource(s) shared via the legacy COT sharing mechanism, indicated by the shared COT 538 and specifically used for the ongoing current communication with the first wireless device 300. Wireless device 300A may be seen as one or more second wireless devices, different from the first wireless device 300.

The additional spectrum resource(s) as indicated by the time slots 539, 540, 541, 542 may be seen as a channel occupancy opportunity(ies) that the network node 400 is aware of and/or has access to e.g. via communication being conducted with one or more other wireless devices 300A. As one example, a network node 400 communicates with another wireless device 300A and does not allow any COT sharing for that specific slot, the network node 400 may choose to let another wireless device, such as the first wireless device 300, use the spectrum resources and may therefore share a channel opportunity, such as resources indicated by the 539, 540, 541, 542. As another example, the network node may in addition to the potential usage of the resources by another device 300A also indicate the resources as potentially usable by the first wireless device 300. In other words, the network node 400 may or may not allow other wireless devices with which the network node communicates to re-use the acquired resources (here indicated via shared channel occupancy time slots) such as indicated via time periods 539, 540, 541, 542. The disclosed network node 400 can indicate to the first wireless device 300 additional spectrum resource(s) which is available, where a CCA procedure is already conducted and may allow a different CCA for the wireless device 300 procedure due to the indication. As one example the sharing of the resources may indicate to the wireless device 300 that the resources are ready for the wireless device 300 to transmit. When the network node 400 identifies additional spectrum resource(s) the network node 400 sends to the first wireless device 300 control signaling 544 which includes information indicative of the additional spectrum resources that allow the allocation. Control signalling 544 is for example a scheduling with Shared Channel Occupancy indication in DCI and with additional spectrum resources indicated.

The first wireless device 300 is allowed to use additional spectrum resource(s) as indicated in the control signaling 544 that provides the first wireless device 300 with optional additional spectrum resources. In FIG. 2C, the additional spectrum resources are indicated via additional channel occupancy times 539, 540, 541, 542 but may be indicated by different type of indications, such as additional frequency ranges 602, 603, 604, 605 of FIGS. 2D-2E that may be referred to as part of a bandwidth (bandwidth part). The additional spectrum resources may be indicated as a combination of indication of time and spectrum ranges. The additional spectrum resources may be coupled to a limitation in time for potential usage by the wireless device. Such limitation in time may be imposed by a shared COT 539, 540, 541, 542. The COT value may be same or different for different resources. The COT value for a given frequency resource may be same for the wireless device and the network node, or it may be different such as a shorter or longer time period. Stated differently, the additional spectrum resources may be seen as coming from additional potential spectrum resources other than the resources (such as resource 601 of FIGS. 2D-2E) specifically used for the ongoing current communication with the first wireless device 300 within the communication of the signaling 544.

As illustrated in FIG. 2C, the first wireless device 300 then transmits uplink control signaling or data 545 within the shared COT window 538 and in case the wireless device 300 has additional uplink transmissions 546, 547, such as low latency data or other control and/or data information that can be transmitted on additional spectrum resources than the ones used for the transmission of data 545, the first wireless device 300 can transmit the additional data information as well, using the additional spectrum resource(s). The wireless device may utilize such additional spectrum resources for control signaling and/or data other than the transmission 545 e.g. for enabling transmission of additional redundancy (e.g. multiple transmissions of information that adds redundancy to the information transmitted in 545). The wireless device may utilize such additional spectrum resources for additional amount of data other than the transmission 545, e.g. in case the amount of data in the transmission buffer has increased and additional transmission resources are therefore needed. The wireless device may utilize such additional spectrum resources for communications related to different types of services than the transmission 545, e.g. for communication having different quality of service requirements such as different timing and/or reliability expectations for the communication. Such service and/or quality expectation may differ on a protocol level for the communication. Such service and/or quality expectation may differ on higher layer aspects, e.g. on the application level in the wireless device.

Figure 3:
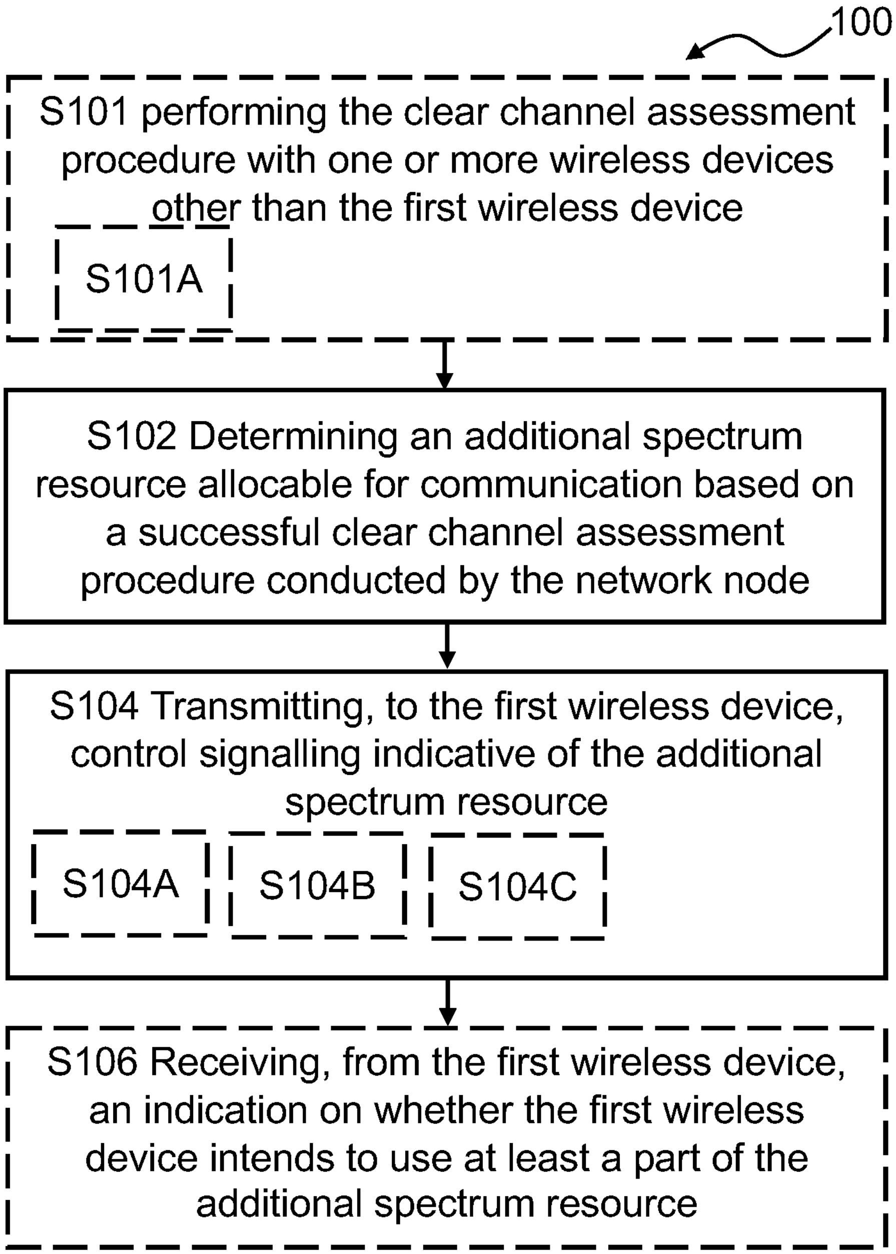
FIG. 3 is a flow-chart illustrating an example method, performed by a network node, for radio resource pre-reservation for communication of a first wireless device in an unlicensed channel according to this disclosure.
Figure 5:
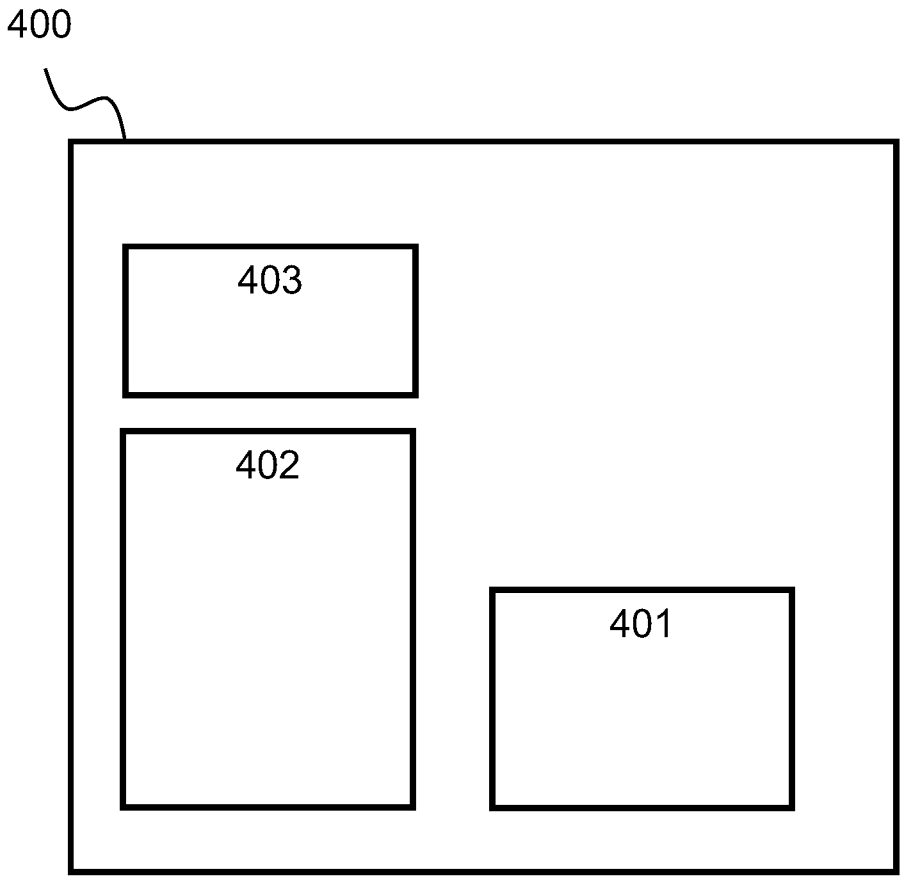
FIG. 5 is a block diagram illustrating an example network node according to this disclosure.

FIG. 3 shows a flow diagram of an example method, performed by a network node according to the disclosure, such as network node 400 of FIGS. 1, 2C, and 5. The method may be performed for radio resource pre-reservation for communication of a first wireless device in an unlicensed channel. The unlicensed channel may be part of an unlicensed spectrum, such as an open shared spectrum, such as an unlicensed band.

A resource may be seen as a time resource and/or a frequency resource. A spectrum resource may be seen as a radio resource in time and/or in frequency.

The method 100 comprises determining S102 an additional spectrum resource allocable for communication based on a successful clear channel assessment procedure conducted by the network node. For example, the network node may have already conducted a Clear Channel Assessment (e.g. Listen Before Talk—LBT) procedure with respect to the spectrum where there may be communication(s) involving other wireless devices, such as a second wireless device different from the first wireless device. The additional spectrum resource is different from a first resource used for ongoing communication with the first wireless device. The additional spectrum resource may be seen as a spectrum resource which can be utilized for communication with the first wireless device in addition to a first resource used for ongoing communication with the first wireless device. The additional spectrum resource may be seen as part of a spectrum shared with other wireless devices, such as a second wireless device, for example illustrated in FIG. 2C, FIG. 2D, and/or FIG. 2E.

A successful CCA corresponds to performing a CCA procedure according to specified requirements for accessing the channel resulting in an availability to access the specific part of the spectrum. Such requirement procedure may be determined by spectrum regulations or specific protocol specifications such as defined by a standardization organization e.g. 3GPP. The result to allow access to the channel may imply a permission to transmit on the channel according to the regulations, e.g. with a maximum transmit energy, a maximum channel occupancy time or similar. In other words, the successful CCA means detecting a free or clear channel or spectrum by performing CCA, where a free or clear channel may mean that a detected channel utilization during the channel sensing may be lower than a utilization threshold, such as a lower detected energy level or a lower detected channel occupancy (e.g. as an amount of time the channel is sensed as busy compared to sensed as not being busy during one or more sensing windows). In one or more example methods, the method 100 comprises performing S101 the clear channel assessment procedure with one or more wireless devices other than the first wireless device. Performing a CCA procedure with one or more wireless devices may relate to utilizing information received from the one or more wireless devices and/or transmitted to the one or more wireless devices where the information is utilized in the CCA procedure. Performing a CCA procedure may comprise performing channel sensing within the CCA to detect whether the spectrum is free or occupied. In one or more example methods, performing S101 the CCA procedure comprises transmitting S101A a signal to the one or more wireless devices after finalizing the CCA procedure with the first wireless device.

The method 100 comprises transmitting S104, to the first wireless device, control signalling indicative of the additional spectrum resource. This allows the network node to indicate the additional spectrum resource that the first wireless device can use for communication with the network node, such as uplink data communication, such as low-latency uplink communication.

In one or more example methods, the additional spectrum resource is part of an active bandwidth part. In one or more example methods, the additional spectrum resource is on a configured bandwidth part different from an active bandwidth part. For example, in NR, the additional spectrum resource may be on the same bandwidth part (BWP) as already being used as the active bandwidth part. Alternatively, for example, the additional spectrum resource may be on a configured BWP but different bandwidth part than the active one.

In one or more example methods, the control signalling indicative of the additional spectrum resource comprises information indicative of an additional channel occupancy time corresponding to an allowed usage time window of the additional spectrum resource. It can be noted that the channel occupancy time, the CCA procedures and other rules for how and when channel occupancy can be shared between the network node and the wireless devices depend on channel access rules as defined e.g. by spectrum regulations for the usage of a specific unlicensed spectrum, such unlicensed band, and/or given by the access rules specified for a certain system.

In one or more example methods, the control signalling indicative of the additional spectrum resource comprises downlink control information (DCI) indicative of the additional spectrum resource. For example, the control signalling can provide information provided in layer 1 (DCI-signalling) which is a low latency (physical layer, a.k.a. layer 1) method for a 3GPP network node to inform about scheduling information to the first wireless device. It may be envisaged that the control signalling is in the form of a specific DCI format, or an addition to existing DCI formats.

In one or more example methods, the additional spectrum resource(s) may have been defined or provided to the wireless device in other communication than the downlink control information 544. For example, the control signalling indicative of the additional spectrum resource(s) of S104 may be part of a dedicated signalling from the network node to the first wireless device. For example, the dedicated signalling may be part of a radio resource protocol. For example, the control signalling indicative of the additional spectrum resource(s) of S104 may be part of a common transmission from a network node (same as network node 400 or another network node) to two or more wireless devices. Such common transmission may be referred to as a broadcasted transmission. In the case where the resources have been defined prior to the downlink control information (for example, illustrated in 544 of FIG. 2C), the control signalling as part of the downlink control information (for example, illustrated in 544 of FIG. 2C) may be referring to a subset or all of the earlier defined resources (i.e. the resources defined prior to the DCI). It may be noted that control signalling as part of the downlink control information may reduce the amount of information required in the control signalling indicative of the additional spectrum resource (for example, illustrated in 544 of FIG. 2C) in order to provide the information indicative of the additional spectrum resources. Further, carrying the control signalling indicative of the additional spectrum resource as part of DCI may reduce the time required to provide the information indicative of the additional spectrum resources.

In one or more example methods, the method 100 comprises receiving 3106, from the first wireless device, an indication of whether the first wireless device intends to use at least a part of the additional spectrum resource.

In one or more example methods, transmitting S104, to the first wireless device, control signalling indicative of the additional spectrum resource comprises transmitting S104A, to the first wireless device, the control signalling indicative of the additional spectrum resource without receiving a scheduling request corresponding to the additional spectrum resource from the first wireless device. For example, from a network perspective, the network node may conduct an allocation of additional spectrum resources for transmissions that may be conducted although the wireless device has not specifically requested the additional spectrum resource(s) for such transmission. Such transmissions may occur when the network node or the wireless device determines that additional spectrum resource(s) is required in order to increase the transmission reliability of an upcoming transmission. Further, such transmissions may occur when the wireless device has additional data in its transmission queue (transmission buffer) requiring other or additional spectrum resource(s) for transmissions. Further, such transmissions may occur when the wireless device as specific control signaling to be transmitted other than signaling utilizing the resources as utilized in the ongoing communication (for example illustrated in 544 and/or 530 of FIG. 2C).

In one or more examples for resource allocation methods, the network node may allocate one or more resources on a wireless device specific basis, meaning that the network node only allows a single wireless device to potentially use the additional transmission opportunities for low latency communication. Alternatively, since the indication of additional spectrum resource(s) for potential low latency traffic can be done without a scheduling request, there is a chance that the available spectrum resources may not be used by a single wireless device and the network node may therefore allocate the same available resources to more than one wireless device.

In one or more example methods, the indication comprises one or more of: a transmission of uplink data on the additional spectrum resource, and a response indicating the resource intended for use by the first wireless device. For example, the additional spectrum resource may be available for a relatively long time (e.g. a COT could be several milliseconds long), but since empty channels on an open spectrum may be used by any of the devices sharing the spectrum depending on the channel access regulations, even by devices not belonging to a same coordinated/scheduled radio access network as illustrated in FIG. 1 the first wireless device may need to immediately respond to the downlink control signalling with an indication on whether the first wireless device intends to use all or parts of the indicated additional spectrum resource(s) or not. With this control signaling, the additional spectrum resource(s) may be considered as utilized which may prevent other devices to utilize the additional spectrum resource(s). For example, the indication may include transmitting uplink data on parts of or all of the indicated additional spectrum resource(s) within a given shorter time period, and/or transmitting a response informing about which additional spectrum resources the first wireless device intends to use.

In one or more example methods, transmitting S104, to the first wireless device, control signalling indicative of the additional spectrum resource comprises transmitting S104B, to the first wireless device, over the open spectrum (such as on a so-called unlicensed band), the control signalling indicative of the additional spectrum resource.

In one or more example methods, transmitting S104, to the first wireless device, control signalling indicative of the additional spectrum resource comprises transmitting S104C, to the first wireless device, over a restricted non-open spectrum (such as a band licensed to be used only by the network illustrated in FIG. 1), the control signalling indicative of the additional spectrum resource.

Figure 4:
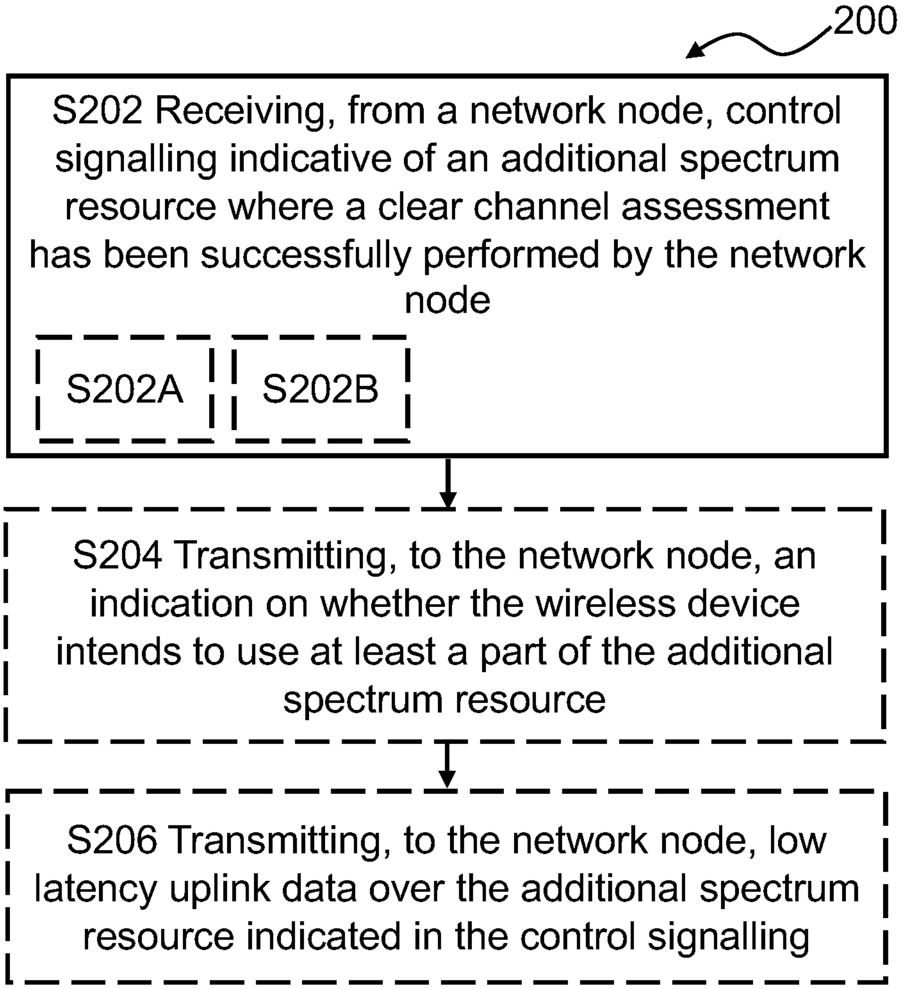
FIG. 4 is a flow-chart illustrating an example method, performed by a wireless device, according to this disclosure.
Figure 6:
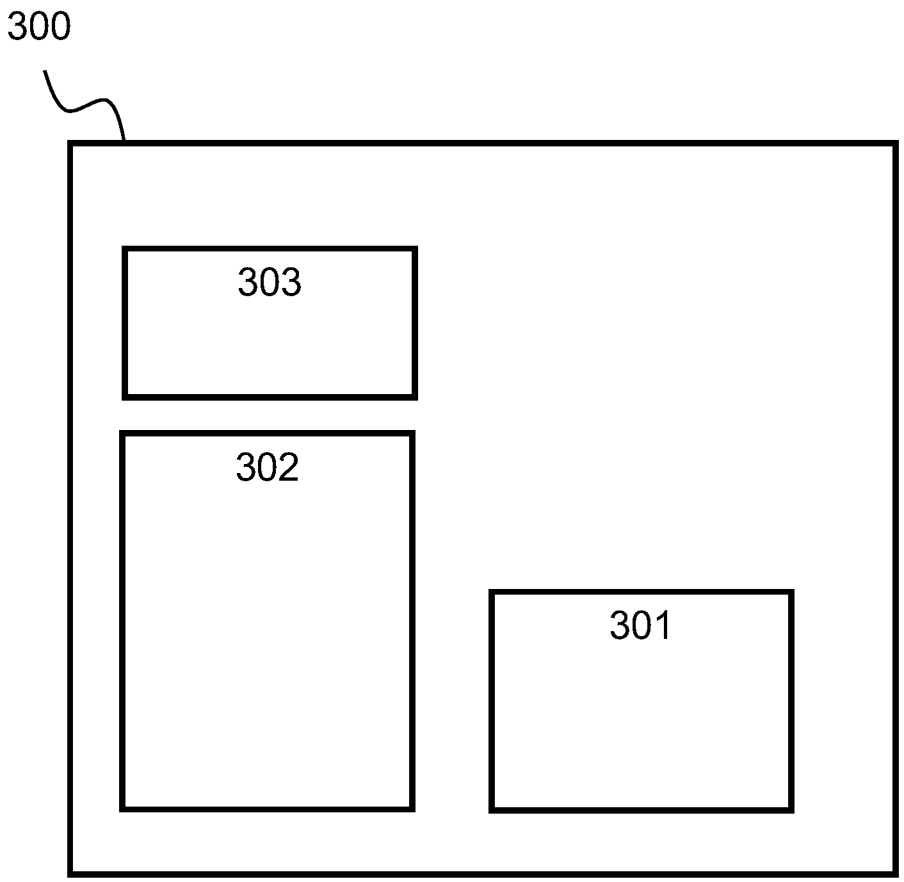
FIG. 6 is a block diagram illustrating an example wireless device according to this disclosure.

FIG. 4 is a flow diagram of an example method, performed by a wireless device according to the disclosure, such as wireless device 300 of FIGS. 1, 2C, and 6. The method may be performed for radio resource pre-reservation for communication of the wireless device in an unlicensed channel, e.g. low-latency communication, in an unlicensed band. The method 200 comprises receiving S202, from a network node, control signalling indicative of an additional spectrum resource where a clear channel assessment has been successfully performed by the network node. The additional spectrum resource is different from a first resource used for ongoing communication between the wireless device and the network node (such as resources 532 utilized for ongoing uplink 530 communication and/or resources 532 for downlink communication 544 of FIG. 2C). The wireless device receives from the network node, the control signalling indicative of the additional spectrum resource transmitted by the network node in step S104 of FIG. 3.

This allows for communication using other and/or different resources than the resources shared for the ongoing signalling between the wireless device and the network node. Such communication may include communication using different services, such as one or more of: services with different QoS classes, services with different data rates (such as higher), low-latency services, additional control signalling, additional communication for reliability, and URLLC services.

The disclosed wireless device can evaluate the instantaneous incoming data for its transmission buffer, and if there is any low latency data traffic that needs immediate transmission, the wireless device can utilize the resources as being allocated via the disclosed control signalling even if the wireless device has not had the time to request those resources in earlier scheduling requests. According to channel access regulations, a different CCA procedure may be required for the additional spectrum resources as utilized as part of the resource sharing signalling/COT sharing. In one or more examples, the wireless device may be allowed to use no or very limited additional CCA procedures for the shared additional spectrum resources, since the network node has already conducted one CCA and established the indicated additional spectrum resource(s) as available from a shared spectrum perspective. In other words, on top of the regular COT sharing of the DL slot used for the signalling, the disclosed wireless device can also utilize the additional spectrum resources that the network node has indicated in S202 as being available from other transmissions. Stated differently, this can leave an additional UL resource headroom that can be used.

In one or more example methods, receiving S202, from the network node, the control signalling indicative of the additional spectrum resource comprises receiving S202A, from the network node, over an open, shared spectrum (such as an unlicensed band), the control signalling indicative of the additional spectrum resource. In one or more example methods, receiving S202, from the network node, the control signalling indicative of the additional spectrum resource comprises receiving S202B, from the network node, over a licensed band, the control signalling indicative of the additional spectrum resource.

In one or more example methods, the control signalling indicative of the additional spectrum resource comprises information indicative of an additional channel occupancy time corresponding to an allowed usage time window of the additional spectrum resource.

In one or more example methods, the additional spectrum resource is part of an active bandwidth part. In one or more example methods, the additional spectrum resource is on a configured bandwidth part different from the active bandwidth part.

In one or more example methods, the control signalling indicative of the additional spectrum resource comprises downlink control information indicative of the additional spectrum resource.

In one or more example methods, the method 200 comprises transmitting 3204, to the network node, an indication on whether the wireless device intends to use at least a part of the additional spectrum resource. This may correspond to S106 of FIG. 3.

In one or more example methods, the indication comprises one or more of: a transmission of uplink data on the additional spectrum resource, and a response indicating the resource intended for use by the wireless device.

In one or more example methods, the method 200 comprises transmitting 3206, to the network node, low latency uplink data over the additional spectrum resource indicated in the control signalling.

FIG. 5 shows a block diagram of an example network node 400 according to the disclosure. The network node 400 comprises memory circuitry 401, processor circuitry 402, and a wireless interface 403. The network node 400 may be configured to perform any of the methods disclosed in FIG. 3. In other words, the network node 400 may be configured for radio resource pre-reservation for communication of a first wireless device in an unlicensed channel.

The wireless interface 403 is configured for wireless communications via a wireless communication system, such as a 3GPP system, such as a 3GPP system supporting one or more of: NR, Narrow-band IoT, NB-IoT, and Long Term Evolution-enhanced Machine Type Communication, LTE-M, licensed bands and unlicensed bands.

The network node 400 is configured to communicate with a wireless device, such as the first wireless device disclosed herein, using a wireless communication system.

The network node 400 is configured to determine (such as with the processor circuitry 402) an additional spectrum resource allocable for communication based on a successful clear channel assessment procedure conducted by the network node 400. The additional spectrum resource is different from a first resource used for ongoing communication with the first wireless device.

The network node 400 is configured to transmit (such as via the wireless interface 403), to the first wireless device, control signalling indicative of the additional spectrum resource.

In one or more example network nodes, the additional spectrum resource is part of an active bandwidth part.

In one or more example network nodes, the additional spectrum resource is on a configured bandwidth part different from an active bandwidth part.

In one or more example network nodes, the control signalling indicative of the additional spectrum resource comprises information indicative of an additional channel occupancy time corresponding to an allowed usage time window of the additional spectrum resource.

In one or more example network nodes, the control signalling indicative of the additional spectrum resource comprises downlink control information indicative of the additional spectrum resource.

In one or more example network nodes, the indication comprises one or more of: a transmission of uplink data on the additional spectrum resource, and a response indicating the resource intended for use by the first wireless device.

Processor circuitry 402 is optionally configured to perform any of the operations disclosed in FIG. 3 (such as any one or more of S101, S101A, S106, S104A, S104B, S104C). The operations of the network node 400 may be embodied in the form of executable logic routines (for example, lines of code, software programs, etc.) that are stored on a non-transitory computer readable medium (for example, memory circuitry 401) and are executed by processor circuitry 402.

Furthermore, the operations of the network node 400 may be considered a method that the network node 400 is configured to carry out. Also, while the described functions and operations may be implemented in software, such functionality may as well be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 5). Memory circuitry 401 is considered a non-transitory computer readable medium.

Memory circuitry 401 may be configured to store information indicative of one or more of additional spectrum resource, downlink control information in a part of the memory.

FIG. 6 shows a block diagram of an example wireless device 300 according to one or more examples of the present disclosure, such as the first wireless device disclosed herein. The wireless device 300 comprises memory circuitry 301, processor circuitry 302, and a wireless interface 303. The wireless device 300 may be configured to perform any of the methods disclosed in FIG. 4.

The wireless device 300 is configured to communicate with a network node, such as the network node 400 disclosed herein, using a wireless communication system.

The wireless interface 303 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, licensed bands and unlicensed bands.

The wireless device 300 is configured to receive (such as via the wireless interface 303), from a network node (such as network node 400), control signalling indicative of an additional spectrum resource where a clear channel assessment has been successfully performed by the network node 400. The additional spectrum resource is different from a first resource used for ongoing communication between the wireless device 300 and the network node 400.

In one or more example wireless devices, the control signalling indicative of the additional spectrum resource comprises information indicative of an additional channel occupancy time corresponding to an allowed usage time window of the additional spectrum resource.

In one or more example wireless devices, the additional spectrum resource is part of an active bandwidth part.

In one or more example wireless devices, the additional spectrum resource is on a configured bandwidth part different from the active bandwidth part.

In one or more example wireless devices, the control signalling indicative of the additional spectrum resource comprises downlink control information indicative of the additional spectrum resource.

In one or more example wireless devices, the indication comprises one or more of: a transmission of uplink data on the additional spectrum resource, and a response indicating the resource intended for use by the wireless device.

The wireless device 300 is optionally configured to perform any of the operations disclosed in FIG. 4 (such as any one or more of S202A, S202B, S204, S206). The operations of the wireless device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the wireless device 300 may be considered a method that the wireless device 300 is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 6). Memory circuitry 301 is considered a non-transitory computer readable medium.

Memory circuitry 301 may be configured to store information such as information indicative of one or more of additional spectrum resource, downlink control information, in a part of the memory.

Examples of methods and products (network node and wireless device) according to the disclosure are set out in the following items:

Item 1. A method, performed by a network node, for radio resource pre-reservation for communication of a first wireless device in an unlicensed channel, the method comprising:
determining (3102) an additional spectrum resource allocable for communication based on a successful clear channel assessment procedure conducted by the network node, wherein the additional spectrum resource is different from a first resource used for ongoing communication with the first wireless device; and
transmitting (3104), to the first wireless device, control signalling indicative of the additional spectrum resource.

Item 2. The method according to item 1, wherein the additional spectrum resource is part of an active bandwidth part.

Item 3. The method according to item 1, wherein the additional spectrum resource is on a configured bandwidth part different from an active bandwidth part.

Item 4. The method according to any of the previous items, wherein the control signalling indicative of the additional spectrum resource comprises information indicative of an additional channel occupancy time corresponding to an allowed usage time window of the additional spectrum resource.

Item 5. The method according to any of the previous items, wherein the control signalling indicative of the additional spectrum resource comprises downlink control information indicative of the additional spectrum resource.

Item 6. The method according to any of the previous items, the method comprising:

performing (3101) the clear channel assessment procedure with one or more wireless devices other than the first wireless device.

Item 7. The method according to item 6, wherein performing (3101) the CCA procedure comprises transmitting (S101A) a signal to the one or more wireless devices after finalizing the CCA procedure with the first wireless device.

Item 8. The method according to any of the previous items, the method comprising:

receiving (3106), from the first wireless device, an indication on whether the first wireless device intends to use at least a part of the additional spectrum resource.

Item 9. The method according to item 8, wherein the indication comprises one or more of: a transmission of uplink data on the additional spectrum resource, and a response indicating the resource intended for use by the first wireless device.

Item 10. The method according to any of the previous items, wherein transmitting (S104), to the first wireless device, control signalling indicative of the additional spectrum resource comprises transmitting (S104A), to the first wireless device, the control signalling indicative of the additional spectrum resource without receiving a scheduling request corresponding to the additional spectrum resource from the first wireless device.

Item 11. The method according to any of the previous items, wherein transmitting (S104), to the first wireless device, control signalling indicative of the additional spectrum resource comprises transmitting (S104B), to the first wireless device, over an open shared spectrum, the control signalling indicative of the additional spectrum resource.

Item 12. The method according to any of items 1-10, wherein transmitting (S104), to the first wireless device, control signalling indicative of the additional spectrum resource comprises transmitting (S104C), to the first wireless device, over a restricted non-open spectrum, the control signalling indicative of the additional spectrum resource.

Item 13. A method, performed by a wireless device, the method comprising:

receiving (3202), from a network node, control signalling indicative of an additional spectrum resource where a clear channel assessment has been successfully performed by the network node, wherein the additional spectrum resource is different from a first resource used for ongoing communication between the wireless device and the network node.

Item 14. The method according to item 13, wherein the control signalling indicative of the additional spectrum resource comprises information indicative of an additional channel occupancy time corresponding to an allowed usage time window of the additional spectrum resource.

Item 15. The method according to any of items 13-14, wherein the additional spectrum resource is part of an active bandwidth part.

Item 16. The method according to any of items 13-15, wherein the additional spectrum resource is on a configured bandwidth part different from the active bandwidth part.

Item 17. The method according to any of items 13-16, wherein the control signalling indicative of the additional spectrum resource comprises downlink control information indicative of the additional spectrum resource.

Item 18. The method according to any of items 13-17, the method comprising:

transmitting (S204), to the network node, an indication on whether the wireless device intends to use at least a part of the additional spectrum resource.

Item 19. The method according to item 18, wherein the indication comprises one or more of: a transmission of uplink data on the additional spectrum resource, and a response indicating the resource intended for use by the wireless device.

Item 20. The method according to any of items 13-19, wherein receiving (S202), from the network node, the control signalling indicative of the additional spectrum resource comprises receiving (S202A), from the network node, over an open shared spectrum, the control signalling indicative of the additional spectrum resource.

Item 21. The method according to any of items 13-19, wherein receiving (3202), from the network node, the control signalling indicative of the additional spectrum resource comprises receiving (S202B), from the network node, over a non-open spectrum, the control signalling indicative of the additional spectrum resource.

Item 22. The method according to any of items 13-21, the method comprising:

transmitting (3206), to the network node, low latency uplink data over the additional spectrum resource indicated in the control signalling.

Item 23. A network node comprising memory circuitry, processor circuitry, and a wireless interface, wherein the network node is configured to perform any of the methods according to any of items 1-12.

Item 24. A wireless device comprising memory circuitry, processor circuitry, and a wireless interface, wherein the wireless device is configured to perform any of the methods according to any of items 13-22.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-6 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a network node, for radio resource pre-reservation for communication of a first wireless device in an unlicensed channel, the method comprising:

determining an additional spectrum resource allocable for communication associated with a successful clear channel assessment procedure initiated by the network node, wherein the additional spectrum resource is different from a first resource used for ongoing communication with the first wireless device; and transmitting, to the first wireless device, control signaling indicative of the additional spectrum resource to provide to the first wireless device the additional spectrum resource without a requirement of the wireless device initiating a clear channel assessment, wherein the additional spectrum resource is on an active bandwidth part or on a configured bandwidth part different from an active bandwidth part.

2. The method according to claim 1, wherein the control signaling indicative of the additional spectrum resource comprises information indicative of an additional channel occupancy time corresponding to an allowed usage time window of the additional spectrum resource.

3. The method according to claim 1, wherein the control signaling indicative of the additional spectrum resource comprises downlink control information indicative of the additional spectrum resource.

4. The method according to claim 1, the method comprising:

performing the clear channel assessment procedure with one or more wireless devices other than the first wireless device.

5. The method according to claim 4, wherein performing the clear channel assessment procedure comprises transmitting a signal to the one or more wireless devices after finalizing the CCA procedure with the first wireless device.

6. The method according to claim 1, the method comprising:

receiving, from the first wireless device, an indication on whether the first wireless device intends to use at least a part of the additional spectrum resource.

7. The method according to claim 6, wherein the indication comprises one or more of: a transmission of uplink data on the additional spectrum resource, and a response indicating the resource intended for use by the first wireless device.

8. The method according to claim 1, wherein transmitting, to the first wireless device, control signaling indicative of the additional spectrum resource comprises transmitting, to the first wireless device, the control signaling indicative of the additional spectrum resource without receiving a scheduling request corresponding to the additional spectrum resource from the first wireless device.

9. The method according to claim 1, wherein transmitting, to the first wireless device, control signaling indicative of the additional spectrum resource comprises transmitting, to the first wireless device, over an open shared spectrum, the control signaling indicative of the additional spectrum resource.

10. The method according to claim 1, wherein transmitting, to the first wireless device, control signaling indicative of the additional spectrum resource comprises transmitting, to the first wireless device, over a restricted non-open spectrum, the control signaling indicative of the additional spectrum resource.

11. A method, performed by a wireless device, the method comprising:

receiving, from a network node, control signaling indicative of an additional spectrum resource associated with a successful clear channel assessment initiated by the network node, wherein the additional spectrum resource is different from a first resource used for ongoing communication between the wireless device and the network node, wherein the additional spectrum resource provides to the wireless device an additional amount of spectrum resources without a requirement of the wireless device initiating a clear channel assessment, wherein the additional spectrum resource is on an active bandwidth part or is on a configured bandwidth part different from an active bandwidth part.

12. The method according to claim 11, wherein the control signaling indicative of the additional spectrum resource comprises information indicative of an additional channel occupancy time corresponding to an allowed usage time window of the additional spectrum resource.

13. The method according to claim 11, wherein the control signaling indicative of the additional spectrum resource comprises downlink control information indicative of the additional spectrum resource.

14. The method according to claim 11, the method comprising:

transmitting, to the network node, an indication on whether the wireless device intends to use at least a part of the additional spectrum resource.

15. The method according to claim 14, wherein the indication comprises one or more of: a transmission of uplink data on the additional spectrum resource, and a response indicating the resource intended for use by the wireless device.

16. The method according to claim 11, wherein receiving, from the network node, the control signaling indicative of the additional spectrum resource comprises receiving, from the network node, over an open shared spectrum, the control signaling indicative of the additional spectrum resource.

17. A method, performed by a wireless device, the method comprising:

receiving, from a network node, control signaling indicating to the wireless device to use an additional spectrum resource to perform an uplink (UL) transmission, the additional resource being associated with a successful clear channel assessment initiated by the network node, wherein the additional spectrum resource is different from a first resource used for ongoing communication between the wireless device and the network node, wherein the additional spectrum resource provides to the wireless device an additional amount of spectrum resources without a requirement of the wireless device initiating a clear channel assessment, wherein the additional spectrum resource is on an active bandwidth part or on a configured bandwidth part different from an active bandwidth part.

18. The method according to claim 17, wherein the additional spectrum resource is on the active bandwidth part or on a configured bandwidth part different from an active bandwidth part.

19. The method according to claim 17, wherein the control signaling indicative of the additional spectrum resource comprises information indicative of an additional channel occupancy time corresponding to an allowed usage time window of the additional spectrum resource.

20. The method according to claim 17, further comprising transmitting to the network node an indication on whether the wireless device intends to use at least a part of the additional spectrum resource.

* * * * *